United States Patent
Fengler et al.

(10) Patent No.: US 9,181,131 B2
(45) Date of Patent: Nov. 10, 2015

(54) REDISPERSIBLE POWDER COMPOSITION FOR DRY MORTAR FORMULATIONS

(75) Inventors: Lars Fengler, Lower Saxony (DE); Rene Kiesewetter, Lower Saxony (DE)

(73) Assignee: Dow Global Technologies LLC, Midland, MI (US)

(*) Notice: Subject to any disclaimer, the term of this patent is extended or adjusted under 35 U.S.C. 154(b) by 821 days.

(21) Appl. No.: 13/106,022

(22) Filed: May 12, 2011

(65) Prior Publication Data

US 2011/0281976 A1 Nov. 17, 2011

Related U.S. Application Data

(60) Provisional application No. 61/395,706, filed on May 17, 2010.

(51) Int. Cl.
| | |
|---|---|
| C04B 24/26 | (2006.01) |
| C04B 28/04 | (2006.01) |
| C04B 40/00 | (2006.01) |
| C04B 111/00 | (2006.01) |

(52) U.S. Cl.
CPC .............. *C04B 28/04* (2013.01); *C04B 40/0042* (2013.01); *C04B 2111/00637* (2013.01); *Y02W 30/92* (2015.05)

(58) Field of Classification Search
CPC ............................ C04B 24/2647; C04B 14/06
See application file for complete search history.

(56) References Cited

U.S. PATENT DOCUMENTS

| | | | |
|---|---|---|---|
| 4,960,465 A | 10/1990 | Arfaei | |
| 6,489,381 B1 | 12/2002 | Dreher et al. | |
| 6,569,234 B2 * | 5/2003 | Yamashita et al. | 106/696 |
| 7,388,047 B2 | 6/2008 | Weitzel et al. | |
| 2002/0035174 A1 | 3/2002 | Garrett et al. | |
| 2002/0195025 A1 † | 12/2002 | Bacher | |
| 2003/0144384 A1 | 7/2003 | Chen et al. | |
| 2007/0155862 A1 † | 7/2007 | Haerzschel | |
| 2010/0010120 A1 | 1/2010 | Kensicher et al. | |
| 2010/0034978 A1 † | 2/2010 | Garuti, Jr. | |

FOREIGN PATENT DOCUMENTS

| | | |
|---|---|---|
| CN | 1385392 A | 12/2002 |
| CN | 101555106 A | 10/2009 |
| CN | 101624276 A | 1/2010 |
| EP | 1498446 A1 | 1/2005 |
| JP | 2009132557 A | 6/2009 |
| SU | 430111 | 5/1974 |
| WO | 2008151879 A1 | 12/2008 |
| WO | 2009156163 † | 12/2009 |

OTHER PUBLICATIONS

Technical Data Sheet for Kao Chemical GmbH; Mighty 21 PSD—dated May 2007.*
F. Winnefeld et al., "Interaction of Polycarboxylate-based Superplasticizers and Cements: Influence of Polymer Structure and C3A-content of Cement," EMPA Switzerland, 2007, pp. 1-12.
Joachim Von Seyerl, "Use of Polycarboxylate Ethers to Improve Workability of Castables," published in cfi/Ber. DKG 84 (2007) No. 9, p. E46ff.

\* cited by examiner
† cited by third party

*Primary Examiner* — Peter D Mulcahy
(74) *Attorney, Agent, or Firm* — Andrew E. C. Merriam

(57) ABSTRACT

The present invention relates to a redispersible powder composition for use in the preparation of dry mortar formulations, especially of cementitious bound tile adhesives (CBTA). The invention further relates to a dry mortar formulation comprising said redispersible powder composition. Furthermore, the invention is directed to a method of increasing the open time of a dry mortar formulation without deteriorating the mechanical strength of the cured dry mortar formulation.

10 Claims, No Drawings

REDISPERSIBLE POWDER COMPOSITION FOR DRY MORTAR FORMULATIONS

This application claims the benefit of priority under 35 U.S.C. §119(e) of U.S. Provisional Patent Application No. 61/395,706 filed on May 17, 2010. The present invention relates to a redispersible powder composition for use in the preparation of dry mortar formulations, especially of cementitious bound tile adhesives (CBTA). The invention further relates to a dry mortar formulation comprising said redispersible powder composition. Furthermore, the invention is directed to a method of increasing the open time of a dry mortar formulation without deteriorating the mechanical strength of the cured dry mortar formulation.

FIELD OF THE INVENTION

Tile adhesives are used to install tiles in residential and commercial buildings on floors or on walls. Depending on the local construction technology, regional needs and building traditions, the choice of the raw material and the performance criteria as well as the norms and guidelines for testing the adhesives can differ from country to country.

Beside the mentioned differences important performance criteria are in any case the tensile adhesion strength, the open time and the slip resistance. Especially the extended open time is a key feature for a cement based tile adhesive for tiling as well as for other dry mortar applications. Extended open times for mortars are highly desirable when installing tiles in drier climate zones, in exterior applications where windy conditions often prevail and when installing very large-sized tiles that require more time for adjusting grout lines. On the other hand, the more porous the substrate and the more absorptive the tile is, the less time an installer has to lay tiles. While a typical mortar may result in loss of bonding, a tile adhesive with extended-open-time properties will give the installer the necessary time to achieve optimal adhesion.

However, not only CBTAs are concerned. The foregoing in principle applies to all dry-mortar formulations where slip is an issue, e.g. where the product is applied on vertical substrates. Therefore, also hand or machine applied gypsum plaster, cement renders, water proofing membranes, mineral coatings for insulation systems like ETICS (=external insulation composite systems) are concerned.

EP1498446A1 relates to water-redispersible polymer powder compositions based on vinyl esters, vinyl chloride, (meth)acrylate monomers, styrene, butadiene and ethylene and their use as binders in hydraulically setting adhesives, e.g. in thermal insulation composite system mortars, and in tile adhesives based on cements, the addition of such redispersible powders shall increase the water retention capacity of the mortar, reduce evaporation by film formation, and, as an additional binder, increase the mechanical strength of the cured mortar. EP1498446A1 discloses improved water-redispersible polymer powder compositions which further increase the mechanical strength of cured mortar The problem addressed by the invention was to provide a dry-mortar formulation, e.g. a cementitious bound tile adhesive, having at least an increased open time with at least an acceptable mechanical strength, e.g. in terms of tensile adhesion strength, of the cured dry mortar formulation. A further problem addressed by the invention was to provide a modifying composition (i.e. a modifier composition) which can be added to a standard dry-mortar formulation, e.g. a cementitious bound tile adhesive, wherein the modifier composition imparts the standard dry mortar formulation with at least an increased open time and at the same time with an at least acceptable mechanical strength of the cured dry mortar formulation. The inventors have now found that at least a certain type of superplasticizer, namely (meth)acrylic acid polymers and derivatives thereof, in combination with a redispersible polymer powder if added to a standard dry mortar formulation effectively increases the open time of the dry mortar formulation without deteriorating the tensile adhesion strength of the cured dry mortar formulation.

STATEMENT OF THE INVENTION

In a first aspect of the invention, there is provided a composition for modifying (i.e. modifier composition) a dry mortar formulation comprising as distinct particulate compounds a water-redispersible polymer powder and a (meth)acrylic acid polymer.

In a second aspect of the invention, there is provided the use of a composition comprising as distinct particulate compounds a water-redispersible polymer powder and a (meth)acrylic acid polymer as a modifier composition for a standard dry mortar formulation.

In a third aspect of the invention, there is provided a modified dry mortar formulation comprising a standard dry mortar formulation and a modifier composition, the modifier composition comprising as distinct particulate compounds a water-redispersible polymer powder and a (meth)acrylic acid polymer.

In a fourth aspect of the invention, there is provided a method of making a modified dry mortar formulation comprising the steps of: a) providing a standard dry mortar formulation, and b) admixing a modifier composition according to the invention to the standard dry mortar formulation, wherein the compounds of the modifier composition can be admixed individually or in combination to the standard dry mortar formulation.

In a fifth aspect of the invention, there is provided a method of increasing the open time of a dry mortar formulation without deteriorating the tensile adhesion strength of the dry mortar formulation when cured comprising the steps of: a) providing a standard dry mortar formulation, b) admixing a modifier composition according to the invention to the standard dry mortar formulation, wherein the compounds of the modifier composition can be admixed individually or in combination to the standard dry mortar formulation, c) admixing water to the modified dry mortar formulation, and d) processing the water-containing modified dry mortar formulation in any standard manner.

It is surprising that the incorporation of a substance which is known to have a superplasticizing effect, i.e. having the effect of increasing the fluidity of, for example, a binder composition if added to it, and thus normally used as a superplasticizer not only increases the open time of a dry mortar formulation including water-redispersible polymer powder and, preferably, a latent hydraulic mineral binder, but at the same time has no negative effect or even a positive effect on the mechanical strength of the CBTA after curing.

Plasticizers, superplasticizers, liquefiers, water reducers or dispersants are additives that disperse binder particles and increase the fluidity of the binder material (cement or gypsum) to which they are added. Their use in formulations for concrete is well known for many years; they are used to reduce the water-cement ratio, to improve the workability, the rheology (pumpability) and the compression strengths of the final product after it hardens. Superplasticizers are also used for wallboards to increase fluidity of the mix, allowing lower use of water and thus reducing energy to dry the board. Superplasticizers are also part of dry-mortar admixtures, e.g.

self-leveling underlayments, screeds and troweling compounds to improve workability, smoothness of the surface enabling free-flowing abilities as well as self-healing properties.

Plasticizers and superplasticizers can be selected from natural products like Lignosulfonates, e.g. as powders (Na—, Ca— or Ammonium salts) or liquids, or Casein. They can also be selected from synthetic products. Synthetically produced Superplasticizers belong either to the group of polycondensates, generally been manufactured from sulfonated naphthalene condensate (sulfonate formaldehyde, BNS) or sulfonated melamine formaldehyde (polymelamine-formaldehyde-sulfite, PMS) or polycarboxylate ethers.

The "superplasticizers", namely the (meth)acrylic acid polymers, used in the present invention as compound in the modifier composition are preferably water-soluble or water-dispersible polymers, copolymers or terpolymers. They are preferably poly(meth)acrylic acids or derivatives thereof, or copolymers or terpolymers (or derivatives thereof) of at least (meth)acrylic acid monomers with one or more further ethylenically unsaturated monomers. Also the corresponding salts fall under the term (meth)acrylic acid polymer. The term "(meth)acrylic" means either acrylic or methacrylic or a mixture of both.

The superplasticizers are typically (meth)acrylic acid copolymers, preferably copolymers comprising (meth) acrylic acid (i.e. acrylic acid, methacrylic acid or combinations thereof) and at least one ethylenically unsaturated monomer comprising a polyalkylene oxide unit. More preferably the (meth)acrylic acid copolymers are copolymers of (meth)acrylic acid and at least one type of ethylenically unsaturated monomers comprising a polyalkylene oxide unit and optional further type(s) of ethylenically unsaturated comonomer(s). The term (meth)acrylic acid copolymer includes deprotonated and partially deprotonated forms of the copolymers, i.e. their salts such as their sodium, potassium and ammonium salts.

More specifically, the (meth)acrylic acid copolymer comprises in polymerized form:
(a) one or more (meth)acrylic acid monomers selected from acrylic acid and methacrylic acid;
(b) one or more ethylenically unsaturated polyalkylene oxide monomers according to formula (I):

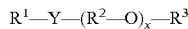

wherein $R^1$ is vinyl, allyl, acryloyl, or methacryloyl, preferably $R^1$ is (meth)acryloyl;
Y is O, S, PH or NH, preferably Y is O;
$R^2$ is $C_2$ to $C_4$ alkylene that can be linear or branched, wherein each $R^2$ can be the same or different within one molecule of $R^1$—Y—$(R^2$—O$)_x$—$R^3$, preferably $R^2$ is ethylene;
X is an integer from 10 to 500, preferably from 100 to 300; and
$R^3$ is H, an aliphatic (including cycloaliphatic), aromatic or aliphatic-aromatic hydrocarbon radical, preferably $R^3$ is a $C_1$ to $C_{30}$ aliphatic radical or a $C_6$ to $C_{30}$ aromatic radical, more preferably a $C_6$ to $C_{30}$ aromatic radical such as phenyl; and (c) optionally one or more ethylenically unsaturated comonomers different from monomers (a) and (b), preferably an ethylenically unsaturated comonomer comprising a sulphur-containing moiety such as a sulfonic acid group. An example of a suitable optional comonomer (c) is (meth)allyl sulfonic acid.

Both monomer(s) (a) and (b) may be present in an amount of 1 to 99% by weight each independently on each other, or, for example, 5 to 95% by weight. Preferably, monomer (a) may be present in amount of 10 to 93% by weight. Preferably, monomer (b) may be present in amount of from 1.5 to 30%, by weight. Optional monomer(s) (c) can be present in amount of 0 to 60% by weight, preferably 0 to 30% by weight. The amounts are calculated based on the protonated monomers and the protonated copolymer in question.

Preferred (meth)acrylic acid polymers typically have a bulk density of 200 to 600 g/l according to DIN 51757, and a pH of 5.5 to 8.5 measured in 5%-solution in water according to DGF H-III1. Commercially available examples of such (meth)acrylic acid polymers are polymers of the Mighty® series (Kao Chemicals), especially Mighty® 21 PSN, comprising a copolymer of methacrylic acid or its salt and an aryl terminated polyethylenglycol methacrylate, wherein the polyethylenglycol unit has about 170 units, and Mighty® 21 PSD.

The amount of the (meth)acrylic acid polymer present in the modifier composition according to the invention should be in the range of 0.5 to 30%, preferably 1.0 to 20%, most preferably 2 to 15%, based on the weight of the redispersible polymer powder.

The use of water-redispersible polymer powder in dry-mix mortars is common and known to improve, depending on the type and addition rate, the adhesion on all kind of substrates, the deformability of the mortars, the flexural strength and the abrasion resistance, to name only a few of several properties.

The water-redispersible polymer powder used as compound in the present invention has probably comparable effects on the modifier composition or the modified dry mortar formulation, respectively. The polymer powder comprises one or more compounds selected from homopolymers and/or copolymers and/or terpolymers of one or monomers selected from the group of vinyl esters of unbranched or branched $C_1$-$C_{15}$-alkycarboxylic acids, (meth)acrylic ester of $C_1$-$C_{15}$-alcohols, vinylaromatics, olefins, dienes, and vinyl halogenides.

Examples of suitable homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride. Styrene-acrylic ester copolymers and styrene-1,3-butadiene copolymers.

Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers selected from the group consisting of vinyl esters having from 1 to 12 carbon atoms in the carboxylic acid radical, e.g. vinyl propionate, vinyl laurate, vinyl esters of a-branched carboxylic acids having from 9 to 13 carbon atoms, e.g. VeoVa9®, VeoVa10®, VeoVa11®; copolymers of vinyl acetate, from 1 to 40% by weight of ethylene and preferably from 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an a-branched carboxylic acid having from 9 to 11 carbon atoms and also from 1 to 30% by weight of acrylic esters of unbranched or branched alcohols having from 1 to 15 carbon atoms, in particular n-butyl acrylate or 2-ethylhexyl acrylate, and additionally containing from 1 to 40% by weight of ethylene: copolymers comprising vinyl acetate, from 1 to 40% by weight of ethylene and from 1 to 60% by weight of vinyl chloride; where the auxiliary monomers mentioned may also be present in the polymers in the specified amounts and the percentages by weight in each case add up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate; styrene-acrylic ester copolymers comprising one or more monomers from the group consisting of methyl acrylate, ethyl acrylate, propyl acrylate, n-butyl acrylate, 2-ethylhexyl acrylate; vinyl acetate-acrylic ester copolymers comprising one or more monomers from the group consisting of methyl acrylate, ethyl acrylate, propyl acrylate, n-butyl acrylate, 2-ethylhexyl acrylate and, if desired, ethylene; styrene-1,3-butadience copolymer; where the auxiliary monomers mentioned may also be present in the polymers in the specified amounts and the percentages by weight in each case add up to 100% by weight.

The monomers and the proportions by weight of the comonomers are chosen so that, in general, a glass transition temperature T of from −50° C. to +50° C., preferably from −30° C. to +40° C., results. The glass transition temperature $T_g$ of the polymers can be determined in a known manner by means of differential scanning calorimetry (DSC). The $T_g$ can also be calculated approximately beforehand by means of the Fox equation. According to T. G. Fox, BULL. AM: Physics SOC. 1, 3 page 123 (1956); $1/T_g = X1/T_g1 + x2/T_g2 + \ldots + xn/T_gN$, where xn is the mass fraction (% by weight/100) of the monomer n and $T_gn$ is the glass transition temperature in Kelvin of the homopolymer of the monomer n. $T_g$ values for homopolymers are given in the Polymer Handbook 2nd Edition. J. Wiley & Sons. N.Y. (1975).

Water-redispersible polymer powders are produced by spray-drying techniques of water-based dispersions based on, for example, the above mentioned homopolymers and/or copolymers. The water-redispersible polymer powder may comprise one or more compounds selected from protective colloids and antiblocking agents. EP1498446A1 discloses methods and examples of producing such water-redispersible polymer powders.

The above mentioned term "as distinct particulate compounds" means that the compounds of the composition according to the invention, namely the water-redispersible polymer powder and the (meth)acrylic acid polymer together with optional further compounds, are dry blended in any order to give a dry particulate blend at least comprising the necessary compounds. Preferably, the compounds are provided in separated form prior to blending. However, it is not necessary that the compounds are provided in pure form, each compound can also be provided as composition comprising additional optional ingredients. Decisive for the understanding of the term "as distinct particulate compounds" is that the compounds have not reacted with each other before blending and will not react with each other in the absence of water. It also means that none of the compounds is embedded in a (polymer) matrix of one of the other compounds. The composition for modifying a dry mortar formulation may additionally comprise one or more compounds selected from the group of latent hydraulic mineral binders (e.g. pozzolans). The presence of latent hydraulic mineral binder(s) (e.g. pozzolan) may have a positive effect on the tensile adhesion strength under specific storage conditions. A "latent hydraulic mineral binder" is a hydraulic mineral binder which only sets in the presence of an activator, e.g. an alkaline substance.

As preferred latent hydraulic mineral binders pozzolanes are used. A "pozzolan" as used here refers to silica-containing or silica- and alumina-containing natural or synthetic materials which are not themselves able to act as binders but together with water and lime form water-insoluble compounds having cement-like properties. A distinction is made between natural and synthetic pozzolanas. Natural pozzolanas include glass-rich ashes and rocks of volcanic origin, for example pumice, trass (finely milled tuff), Santorin earth, kieselguhr, hornstones (silica rocks), chert and moler earth. Synthetic pozzolanas include fired, ground clay (ground brick), fly ashes such as ash from a coal-fired power station, silica dust, oil shale ash (oil shale=bituminous lime-containing shale), and calcined kaolin (metakaolin).

Preferred pozzolans used as compound(s) in the inventive composition are selected from the group consisting of pumice, trass, Santorin earth, kieselguhr, hornstones, chert, moler earth ground, brick, fly ash, silica dust, oil shale ash, and metakaolin.

If used, the amount of the pozzolan(s) in the composition according to the invention is typically 5 to 50%, preferably 10 to 40%, and more preferably 12 to 30% based on the weight of the redispersible polymer powder. For purpose of determining the amount of the redispersible polymer powder any eventually present additives of the RDP are excluded.

The composition according to the invention may additionally comprise one or more water-soluble or at least water-swellable polysaccharides as, for example, pectin, guar gum, guar derivatives like guar ethers, gum arabic, xanthan gum, cold-water-soluble starch, starch derivatives like starch ethers, chitin, cellulose and cellulose derivatives. These compounds act as water retention aid and as rheological modifier (thickener). In accordance with the present invention, both ionic and nonionic polysaccharides or their derivatives, in particular cellulose ethers, having a thermal flocculation point and those without a thermal flocculation point may be used.

The optional addition of a thickener may lead to a thickening and/or rheological performance which can be detrimental to the intended effects of the present invention, especially if an increased addition rate of a RDP-MC blend is used. Therefore, attention has to be paid when optionally adding polysaccharides to the compositions of the invention. The core idea of the invention is the use of either blends of RDP and superplasticizer or blends of RDP, superplasticizer and latent hydraulic binders like pozzolan. It is important that these products even at higher dosages do not lead to an excessively increased thickening.

The modifier composition according to the invention is especially intended to be used in dry mortar formulation. The composition can be admixed to the components of the dry mortar formulation when manufacturing the dry mortar formulation. Alternatively, the composition according to the invention may be added later to a standard dry mortar formulation not initially containing the modifier composition according to the invention. So, subject matter of the present invention is also the composition for modifying a dry mortar formulation if packaged in one single package unit. Such a single package unit may be sold separately from standard dry mortar formulation.

In an alternative embodiment of the present invention at least one compound from the composition is packaged separately in a first package unit while the remaining compounds from the composition are packaged in a second package unit. This is a kind of kit comprising at least two different compounds or compositions each packaged in at least one package unit, wherein the sum of the compounds or compositions packaged in the package units corresponds to the modifier composition of the invention as described above. The two or more package units may be sold separately from a standard dry mortar formulation. For example, one embodiment of the kit can be the following: The latent hydraulic mineral binder (e.g. pozzolan) is/are packaged in at least one of the package units and the water-redispersible polymer powder and/or the superplasticizer (e.g. (meth)acrylic acid polymer) is/are packaged in at least one of the package units not containing the pozzolan(s).

A further subject-matter of the present invention is the use of the composition as a modifier composition for a standard dry mortar formulation. Standard dry mortar formulations to which the inventive modifier composition may be added comprises at least cement. Further ingredients may be added dependent on the intended use and as known to the person skilled in the art.

As already mentioned above the modified dry mortar formulation according to the present invention comprises a standard dry mortar formulation and the modifier composition as specified in detail above. Preferably, the modifier composition is present in an amount of 0.3 to 40%, preferably 0.4 to 30%, and more preferably 0.5 to 15%, based on the weight of the modified dry mortar formulation.

The present invention also provides a method of making a modified dry mortar formulation. The method of making comprises the steps of: a) providing a standard dry mortar formulation, and b) admixing a modifier composition as specified in detail above to the standard dry mortar formulation, wherein the compounds of the modifier composition can be admixed individually or in combination to the standard dry mortar formulation. Preferably, the modifier composition is present in an amount of 0.3 to 40%, preferably 0.4 to 30%, and more preferably 0.5 to 15%, based on the weight of the modified dry mortar formulation.

When preparing the modified dry mortar formulation according to the invention the relative amounts of the mandatory and optional compounds in the modifier composition should be adapted to the total amounts needed in the final modified dry mortar formulation. It is within the knowledge of a person skilled in the art to prepare a modifier composition with appropriate amounts of mandatory and optional compounds in the light of the amounts of the compounds already present in the standard dry mortar formulation. For example, in case the standard dry mortar formulation already comprises cellulose ether additional amounts of cellulose ether(s) need not necessarily be added to the modifier composition according to the present invention. The total amounts of the various compounds in the final modified dry mortar formulation should be in appropriate ranges which can be identified by the person skilled in the art based on his knowledge and routine tests.

Finally, and as mentioned above the present invention provides a method of increasing the open time of a dry mortar formulation without deteriorating the tensile adhesion strength of the dry mortar formulation when cured. The method of increasing the open time comprises the steps of: a) providing a standard dry mortar formulation, b) admixing a modifier composition as specified in detail above to the standard dry mortar formulation, wherein the compounds of the modifier composition can be admixed individually or in combination to the standard dry mortar formulation, c) admixing water to the modified dry mortar formulation, and d) processing the water-containing modified dry mortar formulation in any standard manner. Preferably, the modifier composition is present in an amount of 0.3 to 40%, preferably 0.4 to 30%, and more preferably 0.5 to 15%, based on the weight of the modified dry mortar formulation.

Preferably, in step b) in both of the above mentioned methods the compounds of the modifier composition are admixed in combination in form of a pre-prepared composition, the pre-preparation comprises the step of blending the dry particulate compounds in any order.

In the below following Examples certain standard and modified dry mortar formulations according to the invention were tested in respect of some of their properties, namely their slip resistance, tensile adhesion strength and open time. In this context the following background information are given:

In Europe the standards DIN EN 12004 and DIN EN 12002 (International standard ISO 13007) define the various performance criteria for adhesives for tiles. The norm EN 12004 specifies the values of performance requirements for all ceramic tile adhesives, i.e. cementitious (C), dispersion (D) and reaction resin (R) adhesives. Each type can be divided into two classes with either normal (type 1) or improved (type 2) properties. The norm DIN EN 12002 defines the deformability of cementitious mortars and grouts.

Cementitious tile adhesives (C) are rated and classified in terms of tensile adhesion strength (DIN EN 12004) and deformability (DIN EN 12002). Tensile adhesion strength is tested for four different storage conditions. Depending on the requirements cementitious tile adhesives are either classified as C1 to achieve minimum values of 0.5 N/mm$^2$ or as C2 with adhesion strengths of at least 1.0 N/mm$^2$ respectively. This classification goes along with additional characteristics: F=mortar with accelerated setting, T=mortar with reduced slip, E=mortar with extended open time, and S=deformable (S1) or highly deformable adhesive (S2).

The introduction of the European Norm EN 12004 and EN 12002 has led to quality categories for cement based tile adhesives of classes C1 and C2 for slip resistance, adhesion strength, open time and transverse deformation (classes S1 and S2). The technical requirements for cementitious tile adhesives specified according to EN 12004 and EN 12002 are outlined in table 1.

Apart from high adhesion strengths after different storage conditions the open time is an important factor and is defined in the test standard EN 1346 as maximum time interval after application at which tiles can be embedded in the applied adhesive and meet the specified tensile adhesion strength requirement. The maximum open time of a mortar refers to the latest time a tile can be laid in without a major loss in final adhesion strength. After 28 days the pull off strength is determined with a minimum requirement of 0.5 N/mm$^2$ after not less than 20 minutes embedding time for standard adhesives; at least 0.5 N/mm$^2$ after not less than 10 minutes embedding time for fast-setting mortars and at least 0.5 N/mm$^2$ after not less than 30 minutes embedding time for high quality tile adhesives are required. According to the EN-standard the minimum requirement for the extended open time is raised from 0.5 N/mm$^2$ after 20 min for a standard open time to 30 minutes for the adhesive with extended open time.

TABLE 1

Cementitious tile adhesives specified according to EN 12004 and EN 12002

| Class | Tensile adhesion strength [N/mm$^2$] | Deformability [mm] | Open time [N/mm$^2$] after embedding time of... | | | Adhesion strength after 6 h [N/mm$^2$] | Slip [mm] |
| --- | --- | --- | --- | --- | --- | --- | --- |
| | | | 10 min | 20 min | 30 min | | |
| C1 | ≥0.5 | | | ≥0.5 | | | |
| C1S1 | ≥0.5 | ≥2.5 | | ≥0.5 | | | |
| C1E | ≥0.5 | | | | ≥0.5 | | |
| C1T | ≥0.5 | | | ≥0.5 | | | ≥0.5 |

TABLE 1-continued

Cementitious tile adhesives specified according to EN 12004 and EN 12002

| Class | Tensile adhesion strength [N/mm²] | Deforma-bility [mm] | Open time [N/mm²] after embedding time of... | | | Adhesion strength after 6 h [N/mm²] | Slip [mm] |
|---|---|---|---|---|---|---|---|
| | | | 10 min | 20 min | 30 min | | |
| C1F | ≥0.5 | | ≥0.5 | | | ≥0.5 | |
| C1ET | ≥0.5 | | | | ≥0.5 | | |
| C1FT | ≥0.5 | | ≥0.5 | | | ≥0.5 | ≥0.5 |
| C2 | ≥1.0 | | | ≥0.5 | | | |
| C2S2 | ≥1.0 | ≥5.0 | | ≥0.5 | | | |
| C2E | ≥1.0 | | | | ≥0.5 | | |
| C2T | ≥1.0 | | | ≥0.5 | | | ≥0.5 |
| C2F | ≥1.0 | | ≥0.5 | | | ≥0.5 | |
| C2ET | ≥1.0 | | | | ≥0.5 | | ≥0.5 |
| C2FT | ≥1.0 | | ≥0.5 | | | ≥0.5 | ≥0.5 |

1) Storage conditions according to EN 12004 as follows: Standard = 28 d at 23° C.; Water = 7 d at 23° C. + 21 d water immersion; Heat = 14 at 23° C. + 14 d 70° C. + 1 d 23° C.; Frost = 7 d at 23° C. + 21 d water immersion + 25 frost-thaw-cycles < acc. to EN 1348; four storage conditions (heat and frost-thaw conditioning optional; labelling as "NPD = No Performance Determined")
2) According to EN 12002

EXAMPLES

The performance of a cementitious tile adhesive according to the invention has been studied by comparing various formulations with and without adding a superplasticizer to the dry-mortar without changing the water-solid ratio.

In tables 2 and 3 tested formulations as reference and according to the invention are summarized. Formulations Nos. 1 to 6 (Table 2) have been taken as reference, Nos. 7 to 12 (Table 3) are according to the invention.

All formulations comprise as base composition: 30 wt.-% Ordinary Portland Cement CEM I 42.5 R (Holcim, Germany), 33.275 wt.-% Silica sand F 32 (Quarzwerke Frechen, Germany), 33.275 wt.-% Silica sand F 36 (Quarzwerke Frechen, Germany), and 0.45 wt.-% Walocel MKX 15000 PF01 (Hydroxyethylmethylcellulose, Dow Wolff Cellulosics, Germany). Additionally, all formulations comprise 3 wt.-% of a redispersible powder composition as given in tables 2 and 3. DLP 212 is a redispersible vinylacetat-ethylene copolymer powder from DOW, DLP 401 B is a redispersible powder from DOW based on styrene/butadiene, Metaver R and Metaver S are pozzolans and trademarks of latent hydraulic cobinders from NEWCHEM, Felsenstrasse 12, CH-8808 Pfaffikon, Switzerland.

The redispersible powder composition of formulations Nos. 1-6 does not include a water-soluble (meth)acrylic acid polymer whereas formulations Nos. 7-12 include a copolymer of methacrylic acid or its salt and an aryl terminated polyethylenglycol methacrylate, wherein the polyethylenglycol unit has about 170 units (Mighty 21 PSN, KAO, Japan).

The water/solid ratio for formulations 1 to 12 is being fixed according to the consistency. For details of water/solid ratio, viscosity of wet mortar (Brookfield RVT, Spindle 96, 5 rpm, 23° C.) and density see tables 2 and 3.

The tests were conducted according to the norm EN 12004 with EN 1346 as sub norm for the open time and EN 1348 as sub norm for the adhesion strengths. The norm EN 1308 was used to measure the slip resistance. The initial and final setting time of the dry mortar was determined with the Vicat-needle-test according to DIN EN 196.

The results clearly show that the use of water-soluble (meth)acrylic acid polymer can favourably be used in a range of 0.1 to 30 wt.-% on redispersible powder to achieve the required performance in terms of improved open times and adjustability time without deteriorating other key properties like setting or adhesion strengths. Also, the use water-soluble (meth)acrylic acid polymer blended with redispersible powder and pozzolane may further improve open time and adhesion strength.

TABLE 2

Comparative Formulations

| | 1 | 2 | 3 | 4 | 5 | 6 |
|---|---|---|---|---|---|---|
| Portland cement 42.5 R (Holcim) [wt.-%] | 30.0 | 30.0 | 30.0 | 30.0 | 30.0 | 30.0 |
| quartz sand F32 [wt.-%] | 33.275 | 33.275 | 33.275 | 33.275 | 33.275 | 33.275 |
| quartz sand F36 [wt.-%] | 33.275 | 33.275 | 33.275 | 33.275 | 33.275 | 33.275 |
| cellul. MKX15000PF01 [wt.-%] | 0.45 | 0.45 | 0.45 | 0.45 | 0.45 | 0.45 |
| redispersible comp.:[1] [wt.-%] | 3.0 | 3.0 | 3.0 | 3.0 | 3.0 | 3.0 |
| DLP 212 [wt.-%] | 3.0 | | | 2.4 | 2.4 | |
| DLP 401 B [wt.-%] | | 3.0 | | | 2.4 | 2.4 |
| Metaver R [wt.-%] | | | 0.60 | | 0.60 | |
| Metaver S [wt.-%] | | | | 0.60 | | 0.60 |
| water/solid ration | 0.21 | 0.22 | 0.21 | 0.21 | 0.22 | 0.22 |
| viscosity [pa*s] | 357 | 569 | 535 | 531 | 577 | 585 |
| density [g/ml] | 1.39 | 1.35 | 1.39 | 1.39 | 1.34 | 1.34 |
| slip resistance EN 1308 [mm] | slip | slip | slip | slip | 7.3 | 3.8 |
| adhesion EN 1348 [N/mm²] | | | | | | |
| norm climate storage | 1.05 | 0.73 | 0.96 | 0.89 | 0.72 | 0.67 |
| water immersion storage | 0.61 | 0.74 | 0.48 | 0.56 | 0.74 | 0.60 |
| heat conditioning | 0.60 | 0.48 | 0.46 | 0.43 | 0.41 | 0.44 |
| frost/thaw cycle conditioning | 0.08 | 0.09 | 0.08 | 0.08 | 0.09 | 0.07 |
| open time EN 1346 [N/mm²] | | | | | | |
| 20 min. | 1.19 | 0.94 | 1.20 | 1.23 | 0.90 | 0.76 |
| 30 min. | 0.00 | 0.57 | 0.00 | 0.19 | 0.51 | 0.46 |

TABLE 2-continued

Comparative Formulations

|  | 1 | 2 | 3 | 4 | 5 | 6 |
|---|---|---|---|---|---|---|
| setting (vicat needle test) | | | | | | |
| initial setting [min.] | 665 | 755 | 664 | 662 | 727 | 741 |
| final setting [min.] | 851 | 959 | 800 | 798 | 916 | 920 |
| total setting time [min.] | 186 | 204 | 136 | 136 | 189 | 179 |

[1] The "redispersible composition" consists of one or more of the following compounds as specified in the table: DLP 212 is a redispersible vinylacetat-ethylene copolymer powder, DLP 401 B is a redispersible powder based on styrene/butadiene, Metaver R and Metaver S are pozzolans.

TABLE 3

Formulations According To The Invention

|  | 7 | 8 | 9 | 10 | 11 | 12 |
|---|---|---|---|---|---|---|
| Portland cement 42.5 R (Holcim) [wt.-%] | 30.0 | 30.0 | 30.0 | 30.0 | 30.0 | 30.0 |
| quartz sand F32 [wt.-%] | 33.275 | 33.275 | 33.275 | 33.275 | 33.275 | 33.275 |
| quartz sand F36 [wt.-%] | 33.275 | 33.275 | 33.275 | 33.275 | 33.275 | 33.275 |
| cellul. MKX15000PF01 [wt.-%] | 0.45 | 0.45 | 0.45 | 0.45 | 0.45 | 0.45 |
| redispersible powder:[1] [wt.-%] | 3.0 | 3.0 | 3.0 | 3.0 | 3.0 | 3.0 |
| DLP 212 [wt.-%] | 2.75 | | 2.15 | 2.15 | | |
| DLP 401 B [wt.-%] | | 2.75 | | | 2.15 | 2.15 |
| Metaver R [wt.-%] | | | 0.60 | | 0.60 | |
| Metaver S [wt.-%] | | | | 0.60 | | 0.60 |
| Mighty 21 PSN [wt.-%] | 0.25 | 0.25 | 0.25 | 0.25 | 0.25 | 0.25 |
| water/solid ratio | 0.21 | 0.22 | 0.21 | 0.21 | 0.22 | 0.22 |
| viscosity [pa*s] | 530 | 573 | 539 | 546 | 675 | 595 |
| density [g/ml] | 1.39 | 1.34 | 1.41 | 1.41 | 1.37 | 1.38 |
| slip resistance EN 1308 [mm] | slip | slip | slip | slip | slip | slip |
| adhesion EN 1348 [N/mm$^2$] | | | | | | |
| norm climate storage | 1.15 | 0.77 | 1.03 | 1.03 | 0.89 | 0.81 |
| water immersion storage | 0.60 | 0.93 | 0.69 | 1.17 | 1.33 | 1.42 |
| heat conditioning | 0.67 | 0.58 | 0.58 | 0.48 | 0.50 | 0.53 |
| frost/thaw cycle conditioning | 0.21 | 0.11 | 0.27 | 0.27 | 0.79 | 0.98 |
| open time EN 1346 [N/mm$^2$] | | | | | | |
| 20 min. | 1.21 | 1.11 | 1.34 | 1.40 | 1.33 | 1.10 |
| 30 min. | 0.95 | 0.82 | 0.96 | 1.08 | 0.50 | 0.69 |
| setting (vicat needle test) | | | | | | |
| initial setting [min.] | 663 | 757 | 650 | 597 | 725 | 752 |
| final setting [min.] | 770 | 911 | 772 | 768 | 876 | 922 |
| total setting time [min.] | 107 | 164 | 122 | 171 | 153 | 170 |

[1] The "redispersible composition" consists of one or more of the following compounds as specified in the table: DLP 212 is a redispersible vinylacetat-ethylene copolymer powder, DLP 401 B is a redispersible powder based on styrene/butadiene, Metaver R and Metaver S are pozzolans, Migthy 21 PSN comprises a copolymer of methacrylic acid or its salt and an aryl terminated polyethylenglycol methacrylate, wherein the polyethylenglycol unit has about 170 units.

The invention claimed is:

1. A composition for modifying a dry mortar formulation, the composition comprising as distinct particulate compounds a water-redispersible polymer powder and a (meth)acrylic acid polymer, wherein the (meth)acrylic acid polymer comprises in polymerized form:
   (a) one or more (meth)acrylic acid monomers selected from acrylic acid and methacrylic acid;
   (b) one or more ethylenically unsaturated polyalkylene oxide monomers according to formula (I):

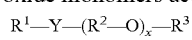
   $R^1-Y-(R^2-O)_x-R^3$ wherein $R^1$ is vinyl, allyl, acryloyl, or methacryloyl;
   Y is O, S, PH or NH;
   $R^2$ is $C_2$ to $C_4$ alkylene that can be linear or branched, wherein each $R^2$ can be the same or different within one molecule of $R^1-Y-(R^2-O)_x-R^3$;
   X is an integer from 100 to 300; and
   $R^3$ is H, an aliphatic, aromatic or aliphatic-aromatic hydrocarbon radical; and
   (c) from 0 to 60% by weight, based on the total weight of monomers of one or more ethylenically unsaturated comonomers different from monomers (a) and (b).

2. The composition according to claim 1, wherein the (meth)acrylic acid polymer is a copolymer comprising (meth)acrylic acid and at least one ethylenically unsaturated polyalkylene oxide monomer according to the formula (I) wherein $R^2$ is ethylene.

3. The composition according to claim 1, wherein in the (meth)acrylic acid copolymer, the at least one ethylenically unsaturated polyalkylene oxide monomer according to formula (I) is a monomer in which $R^3$ is an aliphatic, aromatic or aliphatic-aromatic hydrocarbon radical.

4. The composition according to claim 1, wherein the amount of the (meth)acrylic acid polymer is 0.5 to 30%, based on the weight of the redispersible polymer powder.

5. The composition according to claim 1, wherein the water-redispersible polymer powder comprises one or more compounds selected from homopolymers and/or copolymers and/or terpolymers of one or monomers selected from the group of vinyl esters of unbranched or branched $C_1$-$C_{15}$-alkycarboxylic acids, (meth)acrylic ester of $C_1$-$C_{15}$-alcohols, vinylaromatics, olefins, dienes, and vinyl halogenides.

6. The composition according to claim 1, wherein the composition further comprises one or more compounds selected from the group of latent hydraulic mineral binders.

7. The composition according to claim 6, wherein the latent hydraulic mineral binder is a pozzolan selected from the group consisting of pumice, trass, Santorin earth, kieselguhr, hornstones, chert, moler earth ground, brick, fly ash, silica dust, oil shale ash, and metakaolin.

8. The composition according to claim 7, wherein the amount of the latent hydraulic mineral binder(s) is 5 to 50%, based on the weight of the redispersible polymer powder.

9. A method of using the composition according to claim 1 as a modifier composition for a dry mortar formulation
   comprising admixing the composition with a dry mortar formulation, admixing
   water to the resulting mixture to form a mortar, applying the mortar to a substrate
   and placing a ceramic tile over the thus applied mortar.

10. A method of making a modified dry mortar formulation comprising the steps of:
    a) providing a dry mortar formulation, and
    b) admixing a modifier composition according to claim 1 to the dry mortar formulation to form a modified dry mortar formulation in an amount of 0.3 to 40% based on the weight of the modified dry mortar formulation, wherein the compounds of the modifier composition can be admixed individually or in combination to the dry mortar formulation.

* * * * *